United States Patent
Zhou et al.

(10) Patent No.: US 12,448,634 B2
(45) Date of Patent: Oct. 21, 2025

(54) METHOD FOR PREPARING V-TYPE GRANULAR POROUS STARCH

(71) Applicant: Jiangnan University, Wuxi (CN)

(72) Inventors: Xing Zhou, Wuxi (CN); Zhengyu Jin, Wuxi (CN); Qing Chang, Wuxi (CN); Ren Wang, Wuxi (CN); Jinpeng Wang, Wuxi (CN); Jianwei Zhao, Wuxi (CN); Aiquan Jiao, Wuxi (CN); Jie Long, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 967 days.

(21) Appl. No.: 17/566,724

(22) Filed: Dec. 31, 2021

(65) Prior Publication Data

US 2022/0243238 A1 Aug. 4, 2022

(30) Foreign Application Priority Data

Dec. 31, 2020 (CN) .......................... 202011632449.1

(51) Int. Cl.
*C12P 19/04* (2006.01)
*C08B 30/12* (2006.01)
*C12P 19/14* (2006.01)

(52) U.S. Cl.
CPC .............. *C12P 19/04* (2013.01); *C08B 30/12* (2013.01); *C12P 19/14* (2013.01)

(58) Field of Classification Search
CPC ......... C12P 19/04; C12P 19/14; C08B 30/12; C08J 2303/02; B01J 20/24
USPC ........................................................ 536/102
See application file for complete search history.

(56) References Cited

PUBLICATIONS

Kurakake et al., Published May 1997, Journal of Cereal Science, vol. 25, Issue 3, pp. 253-260 (Year: 1997).*
Zhang et al., Published May 6, 2013, Biomacromolecules, vol. 14, Issue 6, pp. 1945-1954 (Year: 2013).*
Nagahata et al., Published Mar. 11, 2013, Journal of Applied Glycoscience, vol. 60, Issue 2, pp. 123-130 (Year: 2013).*
Zhou et al., Published Mar. 5, 2013, Carbohydrate Polymers, vol. 95, Issue 1, pp. 227-232 (Year: 2013).*
Panyoo et al., Published Oct. 17, 2016, Starch/Stärke, vol. 69, Issue 7-8, pp. 1-7 (Year: 2016).*
Li et al., Published Feb. 12, 2015, Journal of Chemical Technology and Biotechnology, vol. 91, Issue 4, pp. 977-984 (Year: 2015).*
Sarifudin et al., Published May 10, 2020, LWT—Food Science and Technology, vol. 129, pp. 1-8 (Year: 2020).*
Xie et al., Published Sep. 5, 2018, Food Chemistry, vol. 274, pp. 351-359 (Year: 2018).*

* cited by examiner

*Primary Examiner* — Renee Claytor
*Assistant Examiner* — Jaret J Crews
(74) *Attorney, Agent, or Firm* — MATTHIAS SCHOLL P.C.; Matthias Scholl

(57) ABSTRACT

A method for preparing V-type granular porous starch includes the following steps: mixing starch and an ethanol aqueous solution in a temperature of 100-150° C. to yield V-type granular starch; and adding a mixed enzyme including alpha-amylase and amyloglucosidase to a mixture of the V-type granular starch and the ethanol aqueous solution, to enzymatically hydrolyze the V-type granular starch to yield V-type granular porous starch.

10 Claims, 3 Drawing Sheets

METHOD FOR PREPARING V-TYPE GRANULAR POROUS STARCH

CROSS-REFERENCE TO RELAYED APPLICATIONS

Pursuant to 35 U.S.C. § 119 and the Paris Convention Treaty, this application claims foreign priority to Chinese Patent Application No. 202011632449.1 filed Dec. 31, 2020, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to a method for preparing V-type granular porous starch.

Porous starch is a safe and environmental porous material which can be obtained from non-gelatinized raw starch granules through synergistic effect of a number of enzymes at a temperature below starch gelatinization temperature. The application of porous starch includes microencapsulation and adsorption. For example, the porous starch can be used as a microcapsule core material for embedding and adsorbing target substances; the target substances include unstable substances which are easily oxidized and decomposed in air, lipid, medicines, or pesticides with a slow-release function, etc.

However, due to special semi-crystalline granular structure, the raw starch is poor in water solubility and adsorption property and weak in binding capacity with enzymes. According to the traditional method, the raw starch is directly subjected to enzymolysis to yield the porous starch. Although the specific surface area of the raw starch can be increased, the adsorption property of the raw starch is improved, the enzymolysis efficiency is low, and the prepared porous starch is limited in adsorption property and is not dissolved in water.

SUMMARY

A high-temperature high-pressure ethanol method and an enzymolysis method are used for jointly treating starch to yield V-type granular porous starch. The porous starch has a single-helical V-type crystalline structure and has a higher specific surface area, so the water adsorption and oil adsorption capacities of the porous starch are obviously improved in comparison with the porous starch prepared by using conventional methods.

One object of the disclosure is to provide a method for preparing V-type granular porous starch. The method comprises the following steps: mixing starch and an ethanol aqueous solution in a temperature of 100-150° C. to yield V-type granular starch; then without separation of the V-type granular starch, adding a mixed enzyme comprising alpha-amylase and amyloglucosidase to a mixture of the V-type granular starch and the ethanol aqueous solution, to enzymatically hydrolyze the V-type granular starch to yield V-type granular porous starch.

In a class of this embodiment, the ethanol concentration of the ethanol aqueous solution is 50-80% v/v.

In a class of this embodiment, the mass ratio of the starch to the ethanol is between 1:2 and 1:5.

In a class of this embodiment, the starch is selected from the group consisting of common corn starch, cassava starch, rice starch, barley starch, wheat starch, and potato starch.

In a class of this embodiment, the addition amount of the mixed enzyme is 30,000-200,000 U/g starch, the enzyme activity ratio of the α-amylase to the amyloglucosidase in the mixed enzyme is between 1:2 and 1:5; and the V-type granular starch is enzymatically hydrolyzed at 20-60° C. for 6-12 h.

The method comprises the following steps:

(1) adding the starch and the ethanol aqueous solution to a high-temperature high-pressure reactor, to yield the V-type granular starch;

(2) cooling the mixture of the starch and the ethanol aqueous solution in the reactor to a temperature of 25-55° C., and adding the mixed enzyme to the reactor;

(3) carrying out suction filtration on a starch dispersion obtained in (2) by using a vacuum suction filtration device, washing a resulting starch product by using a first ethanol solution, drying the starch product in a first hot air-drying oven, cooling, and grinding the starch product in a first flour mill to obtain the V-type granular porous starch;

(4) dissolving a monoglyceride in hot absolute ethanol, to yield a first solution;

(5) adding the V-type granular porous starch prepared in (3) into ethanol, to yield a second solution; and (6) mixing the first solution and the second solution, carrying out suction filtration on a mixture of the first solution and the second solution, washing a resulting product by using a second ethanol solution, drying the product in a second hot air-drying oven, cooling, and grinding the product in a second flour mill.

In a class of this embodiment, in (1), the reactor operates at a temperature of 90-150° C. and a rotating speed of 500 r/min for 0.5 hour; an ethanol concentration of the ethanol aqueous solution is 50-90% v/v; a concentration of the starch is 10-40% v/v; when the temperature decreases to 60° C., a reaction between the starch and the ethanol aqueous solution stops.

In a class of this embodiment, in (2), the mixed enzyme is 4 mL of a mixed solution of α-amylase and amyloglucosidase with a ratio thereof 1:4; an enzymolysis time is 4-12 h; an enzymolysis temperature is 25-55° C.; and a rotating speed of a stirring blade in the reactor is 100-900 r/min.

In a class of this embodiment, in (3), the starch product is washed by the first ethanol solution having a concentration of 95% v/v for 2 to 3 times, dried at 110° C. for 2 h, ground and screened with an 80-mesh screen.

In a class of this embodiment, in (6), the first solution and the second solution are mixed at 25° C. for 2 hours at a rotating speed of 500 r/min; the resulting product is washed by the second ethanol solution having a concentration of 95% v/v for 2 to 3 times, dried at 50° C. for 12 h, ground and screened with an 80-mesh screen.

A second object of the disclosure is to provide V-type granular porous starch prepared by the above-mentioned method. The V-type granular porous starch has a specific surface area of 9.99-39.94 m$^2$/g, an average pore size of 26.61-27.61 nm, an oil adsorption rate up to 276.33-528.58%, and a water adsorption rate up to 410.24-847.80%.

A third object of the disclosure is to provide an application of the V-type granular porous starch in preparation of adsorbents, embedding agents, food, medicines, cosmetics, and pesticides. The V-type granular porous starch can be used as an adsorbing material, an embedding material, an emulsifier, and a fat substitute.

A fourth object of the disclosure is to provide a method for preparing a starch-lipid embedding substance, which comprises the following step: blending the V-type granular porous starch and lipid in an ethanol aqueous solution to obtain the starch-lipid embedding substance.

In a class of this embodiment, the concentration of the ethanol in the ethanol aqueous solution is 50-80% v/v.

A fifth object of the disclosure is to provide a starch-lipid embedding substance prepared by the abovementioned method.

A sixth object of the disclosure is to provide food and cosmetics comprising the starch-lipid embedding substance.

Compared with the prior art, the following advantages are associated with the method for preparing V-type granular porous starch.

1. The raw starch is treated by combining a high-temperature high-pressure ethanol method and an enzymolysis method, and the high-temperature high-pressure ethanol method and the enzymolysis method interact so that the prepared porous starch has the single-helical V-type crystalline structure and has higher specific surface area and average pore size, and water adsorption capacity and oil adsorption capacity of the porous starch are obviously improved compared with those of porous starch prepared by conventional methods; the specific surface area of the V-type granular porous starch is 9.99-39.94 m$^2$/g; the average pore size is 26.61-27.61 nm, oil adsorption rate is up to 276.33-528.58%, and water adsorption rate is up to 410.24-847.80%; and the specific surface area of traditional A-type porous starch is 2.52 m$^2$/g; the average pore size is 7.36 nm; the oil adsorption rate is 190.23%, and the water adsorption rate is 180.45%.

2. The starch and ethanol can form V-type crystalline structure in a high-temperature environment in the high-temperature and high-pressure reactor, the V-type crystalline structures have relatively strong diffraction peaks at 7°, 14° and 21° in an X-ray diffraction pattern (FIG. 1), the crystallinity is 10.31-15.01%, and the crystallinity can be 16.43-26.13% after enzymolysis.

3. The native common corn starch exhibits an A-type crystalline structure, and its crystallinity is 23.44%. The V-type crystallinity of V-type granular starch is 10.31-15.01%. A higher amorphous region of V-type granular porous starch is beneficial to enzymolysis reaction, the enzymolysis time is effectively shortened, and a relatively high enzymolysis degree can be achieved.

4. The compact double-helical crystalline structure (in a type A, type B and type C crystalline structure according to different double-helical arrangement modes of amylopectin) of the raw starch is converted into a loosely packed V-type crystalline structure, and the crystallinity of the V-type granular starch is reduced compared with that of the raw starch, thus the reaction activity of the V-type granular starch is improved, and even if the V-type granular starch is subjected to enzymolysis in an ethanol solution, a product with a larger specific surface area and higher water and oil adsorption capacity can be obtained in a relatively short time; on one hand, the product retains a single-helical cavity structure of the V-type granular starch, and on the other hand, the specific surface area is remarkably increased due to more large holes; and compared with a traditional preparation method of porous starch, the method has higher enzymolysis efficiency, and the prepared novel porous starch has cold water solubility, higher adsorption capacity, larger specific surface area and wider application range.

5. Hot air drying can be performed on the starch to be below the safe water content in a short time, endogenous enzymes and exogenous enzymes are inactivated, meanwhile, ethanol forming the V-type complex with the starch is volatilized and escapes, which causes the hydrophilic hydroxyl exposure and the specific surface area loosening; thereby remarkably improving the water adsorption performance and oil adsorption capacity.

DETAILED DESCRIPTION

Figure 1:
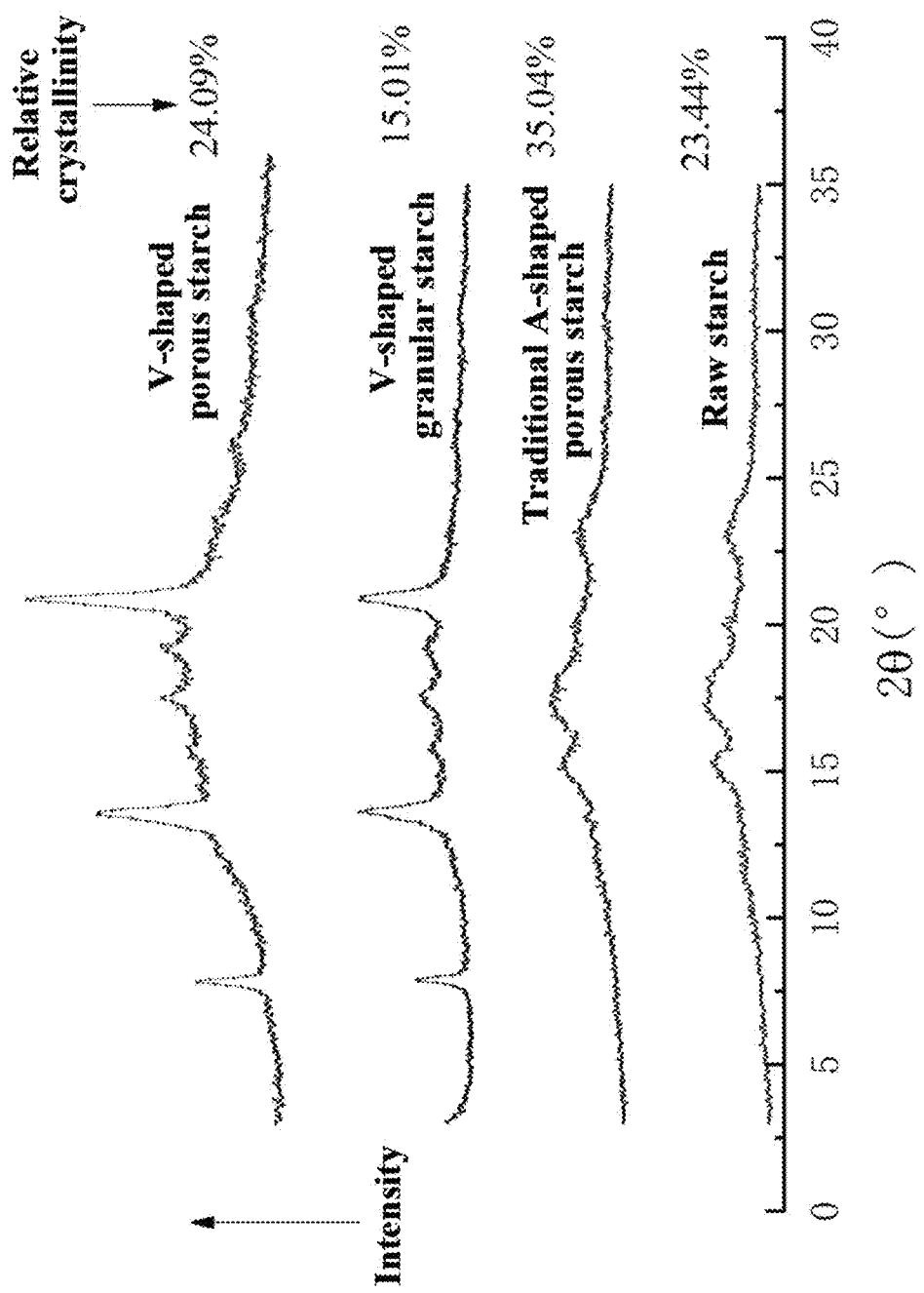
FIG. 1 is an X-ray diffraction pattern and a corresponding relative crystallinity schematic diagram of V-type granular porous starch prepared by Example 1 of the disclosure, V-type granular starch, raw starch, and traditional A-type porous starch.
Figure 2:
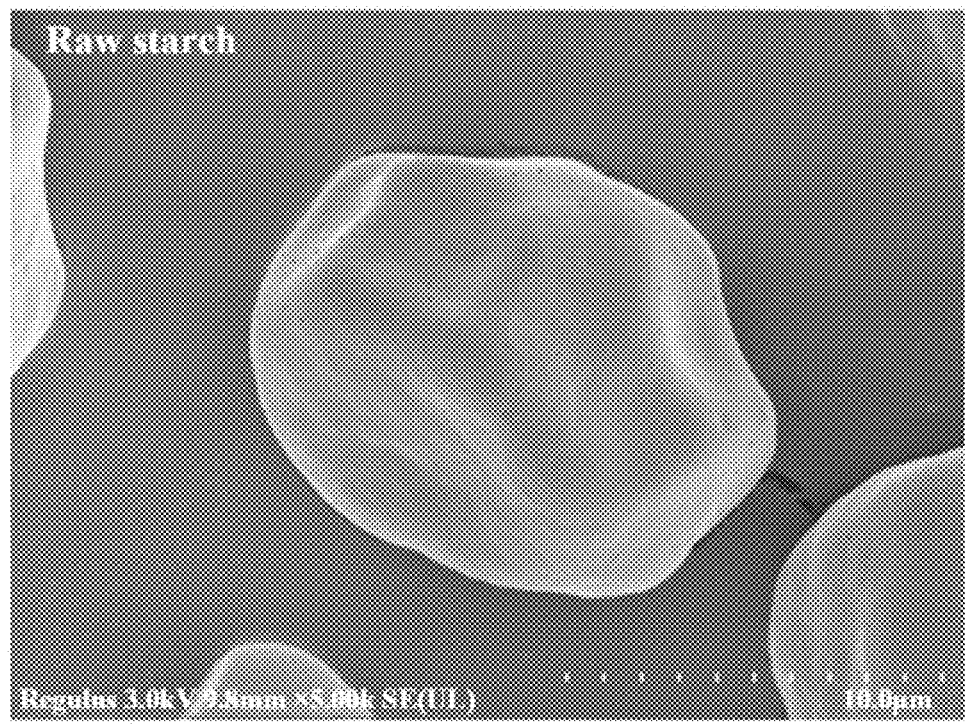
FIG. 2 is a SEM (scanning electron microscope) image of raw starch.
Figure 3:
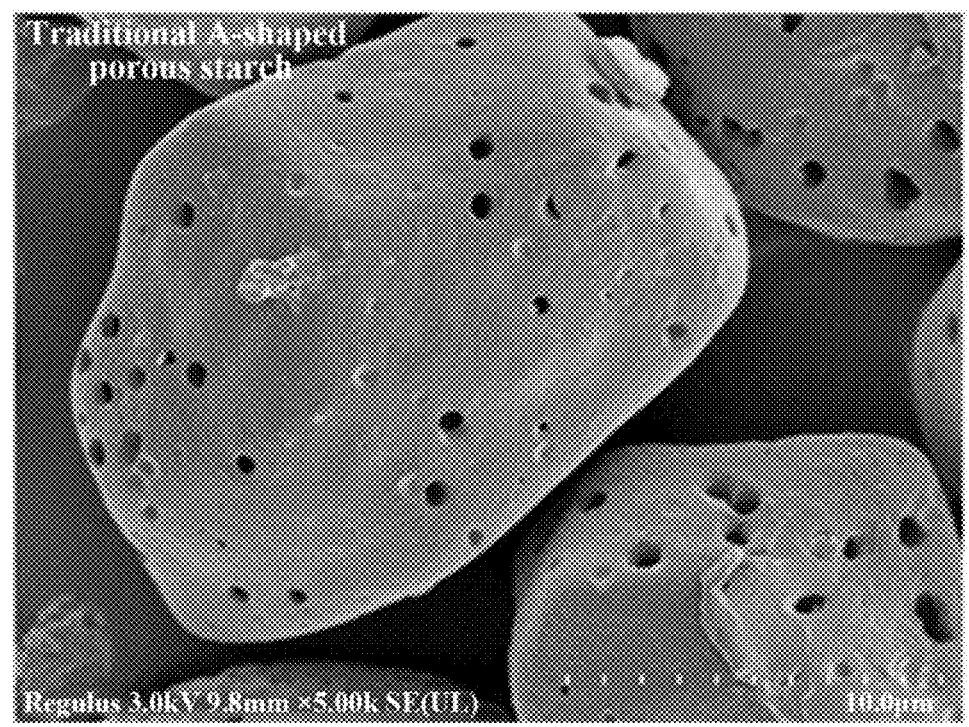
FIG. 3 is a SEM image of traditional A-type porous starch.
Figure 4:
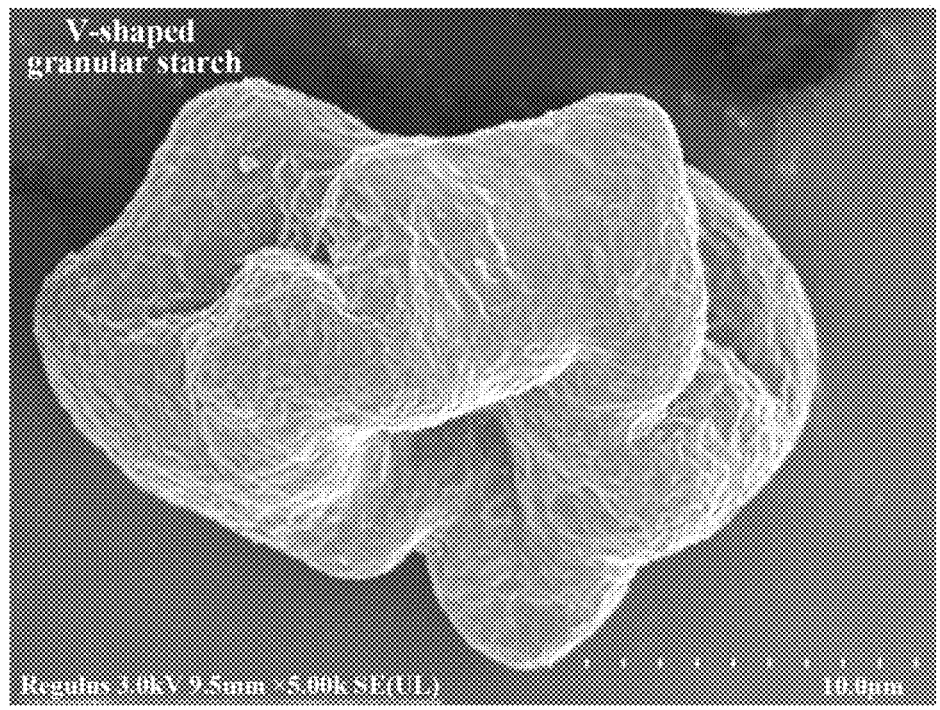
FIG. 4 is a SEM image of V-type granular starch.
Figure 5:
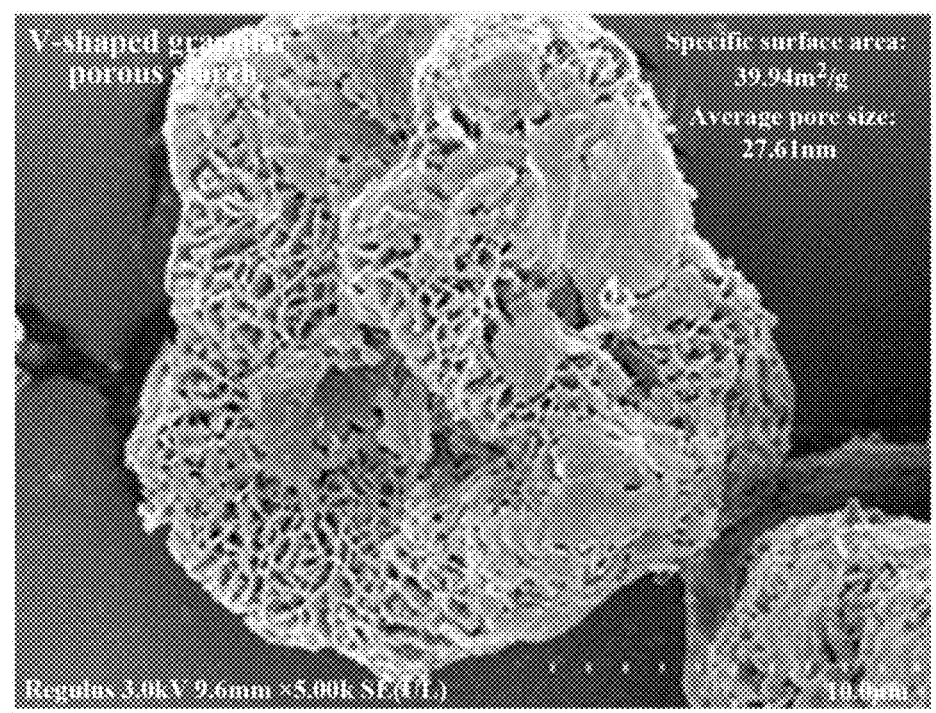
FIG. 5 is a SEM image of V-type granular porous starch prepared by Example 1 of the disclosure.

To further illustrate, experiments detailing a method for preparing V-type granular porous starch are described below. It should be noted that the following examples are intended to describe and not to limit the description.

1. Method for Testing Specific Surface Area and Average Pore Size:

The method comprises the following steps: accurately weighing 0.1000-0.2000 g of a starch sample, and drying the starch sample in an expansion meter matched with ASAP 2020MP at 105° C. for 4 h to remove moisture and gas in the sample; then putting the sample in high-purity liquid nitrogen (the nitrogen concentration is greater than or equal to 99.999%) at −195.8° C.; calculating the specific surface areas of five measurement points in a relative pressure range P/P0=0.06-0.3 (P represents nitrogen partial pressure, and P0 represents saturated vapor pressure of nitrogen at adsorption temperature) by adopting a Brunauer-Emmett-Teller (BET) equation; and measuring the average pore size of the porous material by adopting a Barrett-Joyner-Halenda (BJH) analysis model under the condition that P/P0 is 0.99.

2. Method for Testing Oil Adsorption Rate:

The method comprises the following steps: weighing 1.00 g of porous starch (mass: M1), placing the porous starch in a 50 mL centrifuge tube (mass of the centrifuge tube: M2), adding 5 mL of soybean oil, stirring under 50° C. at 200 r/min for 30 min, centrifuging under 4° C. at 3,500 r/min for 15 min by a centrifuge after stirring, and recording weight M3; then calculating the oil adsorption rate according to the following formula:

$$\text{Oil adsorption rate}=(M3-M1-M2)/M1\times100\%$$

3. Method for Testing Water Adsorption Rate

The method comprises the following steps: weighing 1.00 g of porous starch (mass: M1), placing the porous starch in a 50 mL centrifuge tube (mass of the centrifuge tube: M2), adding 25 mL of deionized water, stirring under 50° C. at 200 r/min for 30 min, centrifuging under 4° C. at 3,500 r/min for 15 min by a centrifuge after stirring, and recording weight M3; then calculating the water adsorption rate according to the following formula:

$$\text{Water adsorption rate}=(M3-M1-M2)/M1\times100\%$$

4. Method for Testing Monoglyceride Complexing Index (CI)

The method comprises the following steps: weighing 0.4 g of a starch-monoglyceride complex into a 50 mL centrifugal tube, and adding distilled water until the total mass is 5 g; heating a suspension in a boiling water bath for 10 min or until starch is completely gelatinized; cooling to reach room temperature, adding 25 mL of distilled water into a gelatinized sample, carrying out vortex oscillation for 2 min, and then centrifuging at 3,000 r/g for 15 min; sucking supernatant (500 μL), transferring the supernatant into a test tube, and mixing the supernatant with 15 mL of distilled water and 2 mL of an iodine solution (distilled water with 2.0% of KI and 1.3% of 12); and measuring ultraviolet absorbance at 620 nm. Wheat starch is used as a reference, and CI=100× ($A_{wheat\ starch}$-$A_{complex}$)/$A_{wheat\ starch}$. Herein A is short for Absorbance.

5. Biological Materials

The corn starch is purchased from the Wuxi Fuyun Biological Co., Ltd.; α-amylase is purchased from Sigma-Aldrich (Shanghai) Trading Co., Ltd., and has the model of 10065-50G and the enzyme activity of 30,000 U/G; and saccharifying enzyme is purchased from the Sigma-Aldrich (Shanghai) Trading Co., Ltd., and has the model of A7095 and the enzyme activity of 81,916 U/g.

Example 1

A Method for Preparing V-Type Granular Porous Starch:

The method for preparing the V-type granular porous starch comprised the following steps: weighing 40 g of common corn starch and 160 g of 50% ethanol, pouring the common corn starch and the ethanol into a high-temperature high-pressure reactor, and reacting, where the operation parameters of the high-temperature high-pressure reactor were as follows: the reaction temperature was 100° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 25° C., and carrying out enzymolysis for 4 h under the temperature of 45° C. at a speed of 400 r/min; and carrying out vacuum filtration after the enzymolysis was finished, washing for 2 to 3 times by using 95% ethanol, drying for 2 h at 110° C., and grinding, and sieving by using an 80-mesh sieve to obtain the V-type granular porous starch. The specific surface area of the V-type granular porous starch was 39.94 m$^2$/g; the average pore size was 27.61 nm; the oil adsorption rate was as high as 528.58%, and the water adsorption rate was as high as 432.60%.

Example 2

A Method for Preparing V-Type Granular Porous Starch:

The method for preparing the V-type granular porous starch comprised the following steps: weighing 40.00 g of common corn starch and 160.00 g of 60% ethanol, pouring the common corn starch and the ethanol into a high-temperature high-pressure reactor, and reacting, where the operation parameters of the high-temperature high-pressure reactor were as follows: the reaction temperature was 130° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 45° C., and carrying out enzymolysis for 6 h under the temperature of 45° C. at a speed of 300 r/min; and carrying out vacuum filtration with a vacuum filtration system after the enzymolysis was finished, washing for 2 to 3 times by using 95% ethanol, drying for 2 h at 110° C., and grinding, and sieving by using an 80-mesh sieve to obtain the V-type granular porous starch. The specific surface area of the V-type granular porous starch was 9.99 m$^2$/g; the average pore size was 26.48 nm; the oil adsorption rate was as high as 420.56%, and the water adsorption rate was as high as 410.24%.

Example 3

A Method for Preparing V-Type Granular Porous Starch:

The method for preparing the V-type granular porous starch comprised the following steps: weighing 40.00 g of common corn starch and 160.00 g of 50% ethanol, pouring the common corn starch and the ethanol into a high-temperature high-pressure reactor, and reacting, where the operation parameters of the high-temperature high-pressure reactor were as follows: the reaction temperature was 100° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 25° C., and carrying out enzymolysis for 6 h under the temperature of 25° C. at a speed of 900 r/min; and carrying out vacuum filtration after the enzymolysis was finished, washing for 2 to 3 times by using 95% ethanol, drying for 2 h at 110° C., and grinding, and sieving by using an 80-mesh sieve to obtain the V-type granular porous starch. The specific surface area of the V-type granular porous starch was 14.97 m$^2$/g; the average pore size was 27.1274 nm; the oil adsorption rate was as high as 326.33%, and the water adsorption rate was as high as 487.02%.

Example 4

A Method for Preparing V-Type Granular Porous Starch:

The method for preparing the V-type granular porous starch comprised the following steps: weighing 40.00 g of common corn starch and 160.00 g of 80% ethanol, pouring the common corn starch and the ethanol into a high-temperature high-pressure reactor, and reacting, where the operation parameters of the high-temperature high-pressure reactor were as follows: the reaction temperature was 150° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 45° C., and carrying out enzymolysis for 12 h under the temperature of 45° C. at a speed of 700 r/min; and carrying out vacuum filtration after the enzymolysis was finished, washing for 2 to 3 times by using 95% ethanol, drying for 2 h at 110° C., and grinding, and sieving by using an 80-mesh sieve to obtain the V-type granular porous starch. The specific surface area of the V-type granular porous starch was 7.97 m$^2$/g; the average pore size was 23.1274 nm; the oil adsorption rate was as high as 276.33%, and the water adsorption rate was as high as 753.02%.

Example 5

A Method for Preparing V-Type Granular Porous Starch:

The method for preparing the V-type granular porous starch comprised the following steps: weighing 40.00 g of common corn starch and 160.00 g of 70% ethanol, pouring the common corn starch and the ethanol into a high-temperature high-pressure reactor, and reacting, where the operation parameters of the high-temperature high-pressure reactor were as follows: the reaction temperature was 150° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 55° C., and carrying out enzymolysis for 12 h under the temperature of 55° C. at a speed of 500 r/min; and carrying out vacuum filtration after the enzymolysis was finished, washing for 2 to 3 times by using 95% ethanol, drying for 2 h at 110° C., and grinding, and sieving by using an 80-mesh sieve to obtain the V-type granular porous starch. Weigh 5.00 g of the obtained V-type granular porous starch and add into 100 mL of 50% ethanol, then mix with 10 mL of hot monoglyceride absolute ethanol solution (10% (w/v)), and stir at 500 r/min for 2 h at room temperature, and embed the monoglyceride, and wash twice by using 95% ethanol, and dry at 50° C. for 12 h, to obtain a starch-monoglyceride inclusion complex. The specific surface area of the V-type granular porous starch was 5.99 m$^2$/g; the average pore size was 31.15 nm; the oil adsorption rate was as high as 276.45%, and the water adsorption rate was as high as 847.80%. The CI of starch-monoglyceride inclusion complex embedded monoglyceride was 89.64%.

Example 6

A Method for Preparing V-Type Granular Porous Starch:

The method for preparing the V-type granular porous starch comprised the following steps: weighing 40.00 g of common corn starch and 160.00 g of 60% ethanol, pouring the common corn starch and the ethanol into a high-temperature high-pressure reactor, and reacting, where the operation parameters of the high-temperature high-pressure reactor were as follows: the reaction temperature was 130° C., the reaction rotating speed was 500 r/min, and the reaction time was 30 min; then cooling; continuously adding 4 mL of mixed enzyme liquid (the addition amount of the mixed enzyme liquid was 66,000 U/g of starch, and the enzyme activity ratio of α-amylase to amyloglucosidase was 1:4) into the reaction solution when the temperature was reduced to 45° C., and carrying out enzymolysis for 8 h under the temperature of 45° C. at a speed of 500 r/min; and carrying out vacuum filtration after the enzymolysis was finished, washing for 2 to 3 times by using 95% ethanol, drying for 2 h at 110° C., and grinding, and sieving by using an 80-mesh sieve to obtain the V-type granular porous starch. The specific surface area of the V-type granular porous starch was 8.97 m$^2$/g; the average pore size was 26.68 nm; the oil adsorption rate was as high as 394.48%, and the water adsorption rate was as high as 432.24%.

Example 7

An Application of V-Type Granular Porous Starch Using as an Embedding Material:

100 mL of 50% ethanol was added into 5.00 g of V-type granular porous starch prepared in Examples 1, 2 and 3 and then mixed with 10 mL of hot monoglyceride anhydrous ethanol solution (10% (w/v)), the mixture was stirred under room temperature at a speed of 500 r/min for 2 h to embed monoglyceride, the embedded product was washed with 95% ethanol twice and then dried at 50° C. for 12 h to obtain a starch-monoglyceride inclusion complex; the aging of the starch could be delayed, the hydrolysis of the starch could be reduced, the digestion resistance could be improved, and thus, the V-type granular porous starch could be used as a stabilizer, a fat substitute and an emulsifier in the fields of foods and functional foods.

Example 8

V-type granular porous starch was prepared by referring to the method of Example 1, the difference was that the temperature in a high-temperature ethanol method was adjusted to be 50° C., 100° C., 130° C., 150° C. and 18° C., other conditions were the same as those in the Example 1, and the result was shown in Table 1.

TABLE 1

| Treatment conditions | oil adsorption rate | water adsorption rate | specific surface area |
|---|---|---|---|
| Starch | 120.24% | 118.45% | / |
| 50° C. | 123.46% | 119.46% | / |
| 100° C. | 528.58% | 432.60% | 39.94 m$^2$/g |
| 130° C. | 394.48% | 432.24% | 8.97 m$^2$/g |
| 150° C. | 276.45% | 847.80% | 5.99 m$^2$/g |
| 180° C. | Starch begins decomposition | | |

A V-type complex was formed by starch and ethanol at a certain temperature; the starch and the ethanol could not form the complex at a lower temperature of 50° C., so the water adsorption rate and the oil adsorption rate of the V-type granular porous starch after enzymolysis were the same as those of raw starch; and the V-type granular porous starch prepared at 100° C. had the best adsorption effect, the adsorption effect was gradually reduced along with the increase of the temperature, and the starch was degraded at 180° C. Therefore, the treatment temperature of the high-temperature ethanol method was preferably 100-150° C.

In addition, the influence of ethanol concentration was also investigated; when the ethanol concentration was 30%, the starch concentration was too low, the swelling of the starch could not be inhibited, the starch was easy to gelatinize, and the original granular form of the starch could not be kept; when the ethanol concentration was 90%, the ethanol concentration was too high, the swelling of the starch could be completely inhibited, a double-helical structure of the starch could not be dissociated to form a V-type single-helical complex, and meanwhile, the higher ethanol concentration could inhibit the enzyme activity of the starch so that the prepared starch was the same as the raw starch, and the oil adsorption rate and the water adsorption rate of the starch were basically consistent with those of the raw starch.

Comparison Example 1

Common corn starch, namely raw starch.

Comparison Example 2

The method in the comparison example 2 referred to the method in the Example 1, the difference was that a high-temperature alcoholization step was omitted, A-type crystalline porous starch was directly prepared through enzymolysis, and other conditions were the same as those in the Example 1. The specific surface area of the A-type porous starch was 2.42 m²/g; the average pore size was 6.76 nm; the oil adsorption rate was 155.42%, and the water adsorption rate was 173.52%. CI of starch-monoglyceride inclusion complex embedded monoglyceride was 78.36%.

Comparison Example 3

V-Type Granular Starch:

The method in the comparison example 3 referred to the method in the Example 1, the difference was that the enzymolysis step was omitted, and the V-type granular starch was directly prepared through high-temperature alcoholization. The method comprised the following specific operation steps: weighing 40 g of common corn starch and 160 g of 50% ethanol, and pouring the common corn starch and the ethanol into a high-temperature high-pressure reactor for reaction, where the operation parameters of the high-temperature high-pressure reactor were as follows: the reaction temperature was 100° C., the reaction rotating speed was 500 r/min, and the reaction time was 30 min; then cooling; and when the temperature was reduced to 25° C., washing for 2 to 3 times by using 95% ethanol, drying for 2 h at the temperature of 110° C., grinding, and sieving by using an 80-mesh sieve. The specific surface area of the V-type granular starch was 1.01 m²/g; the average pore size was 34.03 nm, and the oil adsorption rate was 175.83%, and the water adsorption rate was 467.57%. The CI of starch-monoglyceride inclusion complex embedded monoglyceride was 82.21%.

In Example 1, CI of starch-monoglyceride inclusion complex monoglyceride was 95.12%; and compared with A-type porous starch prepared in the comparison example 2, the oil adsorption rate was increased by 373.16%, the water adsorption rate was increased by 259.08%, the specific surface area was increased by nearly 15 times, the average pore size was increased by 4 times, and the embedding of monoglyceride was also increased by 16.85%.

In Example 2, CI of starch-monoglyceride inclusion complex monoglyceride was 92.12%; and compared with the A-type porous starch prepared in the comparison example 2, the oil adsorption rate was increased by 263.05%, the water adsorption rate was increased by 313.50%, the specific surface area was increased by nearly 3.96 times, the average pore size was increased by 4 times, and the embedding of monoglyceride was also increased by 13.76%.

In Example 3, CI of starch-monoglyceride inclusion complex embedded monoglyceride was 85.56%.

TABLE 2

| Sample | Oil adsorption rate | Water adsorption rate | Specific surface area | Average pore size | Monoglyceride composite index |
|---|---|---|---|---|---|
| Example 1 | 528.58% | 432.60% | 39.94 m²/g | 27.61 nm | 95.12% |
| Example 2 | 420.45% | 410.24% | 9.99 m²/g | 26.48 nm | 92.12% |
| Example 3 | 326.33% | 487.02% | 14.97 m²/g | 27.13 nm | 91.35% |
| Comparison example 1 | 120.24% | 118.45% | / | / | / |
| Comparison example 2 | 155.42% | 173.52% | 2.42 m²/g | 6.76 nm | 78.36% |
| Comparison example 3 | 175.83% | 467.57% | 1.01 m²/g | 34.03 nm | 82.21% |

In summary, the V-type granular porous starch had higher oil adsorption capacity and higher water retention capacity, and had a better embedding effect for long-chain fatty acid substances.

As shown in Table 2, through comparative analysis of the oil adsorption rate, the water adsorption rate, the specific surface area, the average pore size and CI for monoglyceride, compared with raw starch, the prepared V-type granular starch had the advantage that the adsorption capacity was obviously improved; compared with A-type porous starch obtained through enzymolysis of raw starch, the prepared V-type granular starch had the advantage that five evaluation indexes were obviously improved; the oil adsorption rate was increased by 373.16%; the water adsorption rate was increased by 259.08%; the specific surface area was increased by nearly 15 times; the average pore size was increased by 4 times; embedding for monoglyceride was also increased by 14.85%; compared with V-type granular cold-water-soluble starch without enzymolysis, the prepared V-type granular starch had the advantages that the oil adsorption rate was increased by 352.75%; the water adsorption capacity was not greatly changed; the specific surface area was up to 39 times; the average pore size was reduced; the main reason was that the enzymolysis degree was high; the pore size of the porous starch was reduced, and the composite index for monoglyceride was also increased by 13.00%, which indicated that the prepared V-type granular porous starch had the advantage that the adsorption capacity of a V-type single helical cavity was reserved, meanwhile, the adsorption capacity of pores obtained through enzymolysis was greatly improved, and therefore, the V-type crystalline structure and the porous structure had the synergistic effect of '1+1>2' in the aspect of increasing the specific surface area or water adsorption and oil adsorption.

Starch and ethanol could form V-type granular starch in the high-temperature and high-pressure reactor under the high-temperature environment. The V-type crystalline structure of V-type granular starch had strong diffraction peaks at 7°, 14° and 21° in an X-ray diffraction pattern (FIG. 1), and the crystallinity of V-type granular starch was 10.31-15.01%. After enzymolysis, the crystallinity of V-type granular porous starch increased to 16.43-26.13%. Native common corn starch exhibited A-type crystal structure, and its crystallinity was 23.44%. The V-type crystallinity of V-type granular starch was 10.31-15.01%. A higher amorphous region was beneficial to enzymolysis reaction, the enzymolysis time was effectively shortened, and a relatively high enzymolysis degree could be achieved. A compact double-helical crystalline structure (in an A type, B type and C type crystalline structure according to different double-helical arrangement modes of amylopectin) of the raw starch was converted into a loosely packed V-type crystalline structure. The crystallinity of the V-type granular starch was lower compared with that of the raw starch, and thus the reaction activity of the V-type granular starch was improved. Even if the V-type granular starch was subjected to enzymolysis in an ethanol solution, a product with a larger specific surface area and higher water and oil adsorption capacity could be obtained in a relatively short time. On one hand, the product V type granular porous starch retained the cavity structure of the V-type granular starch, and on the other hand, the specific surface area was remarkably increased due to more large holes after enzymolysis. Compared with a traditional preparation method of porous starch, this disclosed method had higher enzymolysis efficiency, and the prepared novel porous starch had cold water solubility, higher adsorption capacity, larger specific surface area and wider application range.

It will be obvious to those skilled in the art that changes and modifications may be made, and therefore, the aim in the appended claims is to cover all such changes and modifications.

What is claimed is:

1. A method, comprising:
    mixing starch and a first ethanol aqueous solution at a temperature of 90-150° C. to yield a mixture of a V-type granular starch and the first ethanol aqueous solution; and
    adding a mixed enzyme comprising alpha-amylase and amyloglucosidase to the mixture of the V-type granular starch and the first ethanol aqueous solution, to enzymatically hydrolyze the V-type granular starch to yield a starch dispersion, wherein an addition amount of the mixed enzyme is 30,000-200,000 U per gram of the V-type granular starch; and vacuum-filtering the starch dispersion, washing for 2 to 3 times with a second ethanol aqueous solution with an ethanol concentration of 95% v/v, drying at 110° C. for 2 h, grinding, and sieving to yield V-type granular porous starch having a specific surface area of 9.99-39.94 m$^2$/g and an average pore size of 26.61-27.61 nm.

2. The method of claim 1, wherein an ethanol concentration of the first ethanol aqueous solution is 50-80% v/v.

3. The method of claim 2, wherein a mass ratio of the starch to the first ethanol aqueous solution is between 1:2 and 1:5.

4. The method of claim 3, wherein the starch is selected from the group consisting of common corn starch, cassava starch, rice starch, barley starch, wheat starch, and potato starch.

5. The method of claim 4, wherein an enzyme activity ratio of the α-amylase to the amyloglucosidase in the mixed enzyme is between 1:2 and 1:5; and the V-type granular starch is enzymatically hydrolyzed at 20-60° C. for 6-12 h.

6. The method of claim 1, further comprising:
    (1) adding the starch and the first ethanol aqueous solution to a reactor, to yield the mixture of the V-type granular starch and the first ethanol aqueous solution;
    (2) cooling the mixture of the V-type granular starch and the first ethanol aqueous solution in the reactor to a temperature of 25-55° C., and adding the mixed enzyme to the reactor to enzymatically hydrolyze the V-type granular starch to yield the starch dispersion;
    (3) carrying out suction filtration on the starch dispersion obtained in (2) by using a vacuum suction filtration device, washing a resulting product by using the second ethanol aqueous solution, drying the product in a first air-drying oven at 110° C. for 2 h, cooling, grinding and screening the product with an 80-mesh screen to obtain the V-type granular porous starch;
    (4) dissolving a monoglyceride in het absolute ethanol, to yield a first solution;
    (5) adding the V-type granular porous starch prepared in (3) into ethanol, to yield a second solution; and
    (6) mixing the first solution and the second solution, carrying out suction filtration on a mixture of the first solution and the second solution, washing a resulting mixture by using the second ethanol aqueous solution, drying the mixture in a second air-drying oven, cooling, and grinding the mixture.

7. The method of claim 6, wherein in (1), the reactor operates at a rotating speed of 500 r/min for 0.5 hour; an ethanol concentration of the first ethanol aqueous solution is 50-90% v/v; a concentration of the starch is 10-40% v/v; and when a temperature in the reactor decreases to 60° C., a reaction between the starch and the first ethanol aqueous solution stops.

8. The method of claim 6, wherein in (2), the mixed enzyme is 4 mL of a mixed solution of α-amylase and amyloglucosidase with a ratio thereof 1:4; an enzymolysis time is 4-12 h; an enzymolysis temperature is 25-55° C.; and a rotating speed of a stirring blade in the reactor is 100-900 r/min.

9. The method of claim 6, wherein in (6), the first solution and the second solution are mixed at 25° C. for 2 hours at a rotating speed of 500 r/min; the resulting mixture is washed by the second ethanol aqueous solution having a concentration of 95% v/v for 2 to 3 times, dried at 50° C. for 12 h, ground and screened with an 80-mesh screen.

10. A V-type granular porous starch, prepared by the method of claim 1, having an oil adsorption rate of 276.33-528.58% by weight, and a water adsorption rate of 410.24-847.80% by weight.

* * * * *